United States Patent
Chiang et al.

(10) Patent No.: US 9,483,682 B1
(45) Date of Patent: Nov. 1, 2016

(54) FINGERPRINT RECOGNITION METHOD AND DEVICE THEREOF

(71) Applicant: Egis Technology Inc., Taipei (TW)

(72) Inventors: Yuan-Lin Chiang, Taipei (TW); Yu-Chun Cheng, Taipei (TW)

(73) Assignee: Egis Technology Inc., Taipei (TW)

( * ) Notice: Subject to any disclaimer, the term of this patent is extended or adjusted under 35 U.S.C. 154(b) by 20 days.

(21) Appl. No.: 14/623,457

(22) Filed: Feb. 16, 2015

Related U.S. Application Data

(60) Provisional application No. 62/067,568, filed on Oct. 23, 2014.

(51) Int. Cl.
*G06K 9/00* (2006.01)
*G06F 17/30* (2006.01)
*G06K 9/62* (2006.01)

(52) U.S. Cl.
CPC ....... *G06K 9/00087* (2013.01); *G06F 17/3028* (2013.01); *G06K 9/6215* (2013.01)

(58) Field of Classification Search
CPC ........... G06K 9/00087; G06K 9/6215; G06K 9/0002; G06K 9/00026; G06K 9/00013; G06K 9/00067; G06F 17/3028
USPC ....... 382/100, 124, 125, 118, 115, 192, 181, 382/190, 116, 195, 209, 217, 218, 172; 340/5.81, 5, 82, 5.83, 5.2, 5.52, 5.53, 340/5.8; 283/68; 726/7; 713/185, 186, 150, 713/168
See application file for complete search history.

(56) References Cited

U.S. PATENT DOCUMENTS

| | | | | |
|---|---|---|---|---|
| 5,040,223 A | * | 8/1991 | Kamiya | G07C 9/00087 382/127 |
| 6,125,192 A | * | 9/2000 | Bjorn | G06F 21/32 340/5.83 |
| 7,050,609 B2 | * | 5/2006 | Huang | G07C 9/00158 340/5.82 |
| 7,103,200 B2 | * | 9/2006 | Hillhouse | G06K 9/6255 382/115 |
| 7,634,117 B2 | * | 12/2009 | Cho | G07C 9/00158 382/124 |

* cited by examiner

*Primary Examiner* — Sheela C Chawan

(57) ABSTRACT

An electronic device and method thereof are provided. The fingerprint recognition method includes: scanning a verifying fingerprint, obtaining a similarity value between the verifying fingerprint and a registered fingerprint, comparing the similarity value with a first threshold, determining that the verifying fingerprint matches the registered fingerprint if the similarity value is equal to or greater than the first threshold; comparing the similarity value with a second threshold, wherein the second threshold is greater than the first threshold; and storing the verifying fingerprint if the similarity value is equal to or smaller than the second threshold.

8 Claims, 2 Drawing Sheets

FINGERPRINT RECOGNITION METHOD AND DEVICE THEREOF

CROSS REFERENCE TO RELATED APPLICATIONS

This Application claims priority of Provisional Patent Application No. 62/067,568, filed on Oct. 23, 2014, the entirety of which is incorporated by reference herein.

BACKGROUND OF THE INVENTION

1. Field of the Invention

The invention generally relates to fingerprint recognition technology, and more particularly to a fingerprint recognition method with increased security and performance through continued updating of a registered fingerprint.

2. Description of the Related Art

In recent years, biometric recognition technology has advanced greatly. Since security codes and access cards may be easily stolen or lost, more and more attention has been paid to fingerprint recognition technology. Currently, fingerprint recognition is commonly implemented in electronic devices, such as mobile phones, smartphones, tablets, notebook computers, and so on. Fingerprints are unique and never-changing, and each person has multiple fingers for identity recognition. In addition, fingerprints can be obtained easily by using fingerprint sensors. Therefore, fingerprint recognition can provide increased security and convenience, and financial security and confidential data can be better protected.

When an electronic device performs fingerprint recognition, the electronic device needs to compare a registered fingerprint for an authorized user with a verifying fingerprint. Therefore, the registered fingerprints should be pre-registered and stored in the electronic device. To do so, the electronic device may request the user to repeatedly scan his finger (or fingers) several times over a fingerprint sensor or other type of detecting means. Based upon these scans, the registered fingerprints can be created and stored. Once the registered fingerprints are determined and stored, the electronic device performs a fingerprint recognition procedure by comparing registered fingerprints for an authorized user with a verifying fingerprint to thus determine whether the user has authorization. However, the registered fingerprints are generated through a simplified procedure (such as obtaining only a minimum number of fingerprint scans), which leads to degraded reliability of fingerprint recognition. Therefore, if the registered fingerprints can be updated by a smart learning scheme, the security and the accuracy of the fingerprint authentication will be increased.

BRIEF SUMMARY OF THE INVENTION

A fingerprint-recognition method and device are provided to overcome the aforementioned problems.

An exemplary embodiment of the invention provides a fingerprint recognition method. The fingerprint recognition method comprises the steps of scanning a verifying fingerprint, obtaining a similarity value between the verifying fingerprint and registered fingerprint, comparing the similarity value with a first threshold, determining that the verifying fingerprint matches the registered fingerprint if the similarity value is equal to or greater than the first threshold, comparing the similarity value with a second threshold, wherein the second threshold is greater than the first threshold, and storing the verifying fingerprint if the similarity value is equal to or smaller than the second threshold.

In some embodiments of the invention, the fingerprint recognition method further comprises the steps of adjusting the first threshold according to a difference between the similarity value and the first threshold if the similarity value is smaller than the first threshold.

An exemplary embodiment of the invention provides an electronic device. The electronic device comprises a fingerprint sensor, a storage unit and a processing unit. The fingerprint sensor is configured to scan a verifying fingerprint. The storage unit is configured to store at least one registered fingerprint. The processing unit is configured to generate a similarity value between the verifying fingerprint and the registered fingerprint, and compare the similarity value with a first threshold. The processing unit is further configured to determine that the verifying fingerprint matches the registered fingerprint if the similarity value is equal to or greater than the first threshold, compare the similarity value with a second threshold, wherein the second threshold is greater than the first threshold, and store the verifying fingerprint to the storage unit if the similarity value is equal to or smaller than the second threshold.

In some embodiments of the invention, the processing unit adjusts the first threshold according to a difference between the similarity value and the first threshold if the similarity value is smaller than the first threshold.

Other aspects and features of the invention will become apparent to those with ordinary skill in the art upon review of the following descriptions of specific embodiments of communication transmission methods and systems.

BRIEF DESCRIPTION OF THE DRAWINGS

The invention will become more fully understood by referring to the following detailed description with reference to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 1:
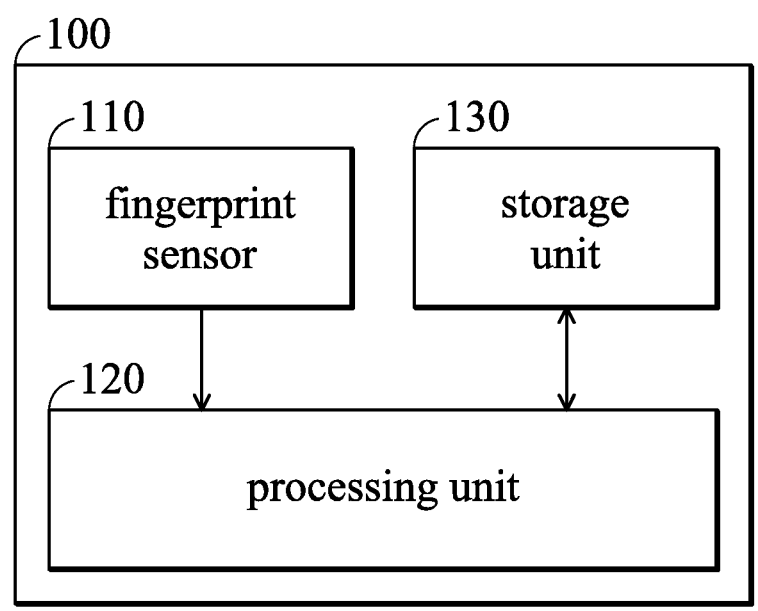
FIG. 1 is an electronic device 100 according to an embodiment of the invention.

FIG. 1 is an electronic device 100 according to an embodiment of the invention. In an embodiment of the invention, the electronic device 100 can be a mobile phone, a smartphone, a tablet, a notebook computer or any electronic device which has a fingerprint recognition function.

As shown in FIG. 1, the electronic device 100 comprises a fingerprint sensor 110, a processing unit 120 and a storage unit 130. FIG. 1 presents a simplified block diagram in which only the elements relevant to the invention are shown. However, the invention should not be limited to what is shown in FIG. 1.

In an embodiment of the invention, for fingerprint recognition, a user has to swipe or press his/her finger over or on the fingerprint sensor 110. The fingerprint sensor 110 will then scan a verifying fingerprint for the user's finger, and transmit the verifying fingerprint to the processing unit 120 for fingerprint recognition.

The processing unit 120 will compare the verifying fingerprint with a registered fingerprint for an authorized user to generate a similarity value. The registered fingerprint is pre-stored in the storage unit 130 and the registered fingerprint may comprise a plurality of enrollment datasets. According to the result of the fingerprint recognition, the processing unit 120 may update one or more of the enrollment datasets or add a new enrollment dataset to the registered fingerprint. The similarity value may be a score to indicate the degree of similarity between the verifying fingerprint and the registered fingerprint.

After obtaining the similarity value, the processing unit 120 will compare the similarity value with a first threshold. The first threshold may be a pre-set default value which is stored in the storage unit 130.

In an embodiment of the invention, the processing unit 120 may compare the similarity value with the first threshold. The processing unit 120 may determine whether the verifying fingerprint matches the registered fingerprint according to the result of the comparison. The processing unit 120 may determine that the verifying fingerprint matches the registered fingerprint if the similarity value is equal to or greater than the first threshold. In an embodiment of the invention, the processing unit 120 may unlock or perform some functions of the electronic device 100 requiring fingerprint authentication when the verifying fingerprint matches the registered fingerprint.

If the similarity value is smaller than the first threshold (i.e. the verifying fingerprint does not match the registered fingerprint), the processing unit 120 may adjust the first threshold according to the value of the difference between the similarity value and the first threshold. Specifically, if the similarity value is smaller than the first threshold, the processing unit 120 may calculate the difference between the similarity value and the first threshold. If the difference is small (i.e. the similarity value approaches the value of the first threshold), the processing unit 120 will raise the first threshold a little. That is to say, if the difference is small, the processing unit 120 may determine that the user might be the authorized user and the failure to pass the fingerprint authentication may be caused by the user's failure to swipe or press his/her finger over or on the fingerprint sensor 110 along or in a direction with a tolerable rotation or offset. If the difference is large (i.e. the similarity value does not approach the value of the first threshold), the processing unit 120 will raise the first threshold dramatically. That is to say, if the difference is large, the processing unit 120 may determine that the user might be an unauthorized user who tries to illegitimately invade into the electronic device 100. The processing unit 120 will then raise the first threshold greatly in order to avoid the invasion of the unauthorized user.

For example, the first threshold is set to be 10. If the similarity value is 9, approaching the first threshold, the processing unit 120 will raise the first threshold a little, e.g. raise the first threshold from 10 to 11. If the similarity value is 1, deviating from the first threshold, the processing unit 120 will raise the first threshold greatly, e.g. raise the first threshold from 10 to 13 or an even larger value than 13.

After the first threshold is adjusted, the fingerprint sensor 110 may scan the user's finger again. Then, the processing unit 120 will compare the re-scanned verifying fingerprint with the registered fingerprint to generate a new similarity value. Then, the processing unit 120 compares the new similarity value with the adjusted first threshold. If the new similarity value is still smaller than the first threshold, the processing unit 120 will adjust the first threshold again according to the difference between the new similarity value and the adjusted first threshold. Namely, the processing unit 120 raises the first threshold again. If the new similarity value is equal to or greater than the adjusted first threshold, the processing unit 120 will determine that the verifying fingerprint matches the registered fingerprint. In an embodiment of the invention, when the new similarity value is equal to or greater than the adjusted first threshold (i.e. the verifying fingerprint matches the registered fingerprint), the processing unit 120 will set the adjusted first threshold to the original default value (the non-adjusted first threshold) for subsequent fingerprint recognition.

In an embodiment of the invention, the processing unit 120 may further determine whether the number of failures (i.e. the verifying fingerprint does not match the registered fingerprint, and fails the fingerprint recognition) is greater than a default value. If the number of failures is greater than the default value (e.g. 5 times), the processing unit 120 may determine that the verifying fingerprint represents an unauthorized user.

In an embodiment of the invention, the processing unit 120 may compare the similarity value with a second threshold if the verifying fingerprint matches the registered fingerprint (i.e. the similarity value is equal to or greater than the first threshold). The second threshold may be a pre-set default value which is stored in the storage unit 130. In addition, in the embodiment of the invention, the second threshold is greater than the first threshold. Therefore, in an embodiment of the invention, the processing unit 120 may compare the similarity value with the first threshold, and then compare the similarity value with the second threshold if the similarity value is greater than the first threshold.

The processing unit 120 may store the verifying fingerprint into the storage unit 130 if the similarity value is equal to or smaller than the second threshold. Namely, the verifying fingerprint will become included in the registered fingerprint for subsequent fingerprint recognition. The verifying fingerprint may become a new enrollment dataset added to the plurality of enrollment datasets of the registered fingerprint, or may replace one of the plurality of enrollment datasets of the registered fingerprint.

The processing unit 120 will not store the verifying fingerprint into the storage unit if the similarity value is greater than the second threshold. If the similarity value is greater than the second threshold, it means that the verifying fingerprint is very similar to one of the enrollment datasets of the registered fingerprint. Therefore, the verifying fingerprint does not have reference value for subsequent fingerprint recognition. Only when the similarity value corresponding to the matched verifying fingerprint is equal to or smaller than the second threshold, the processing unit 120 will store the verifying fingerprint into the storage unit 130 to expand the coverage of the registered fingerprint and increase the performance of the fingerprint recognition.

Figure 2:
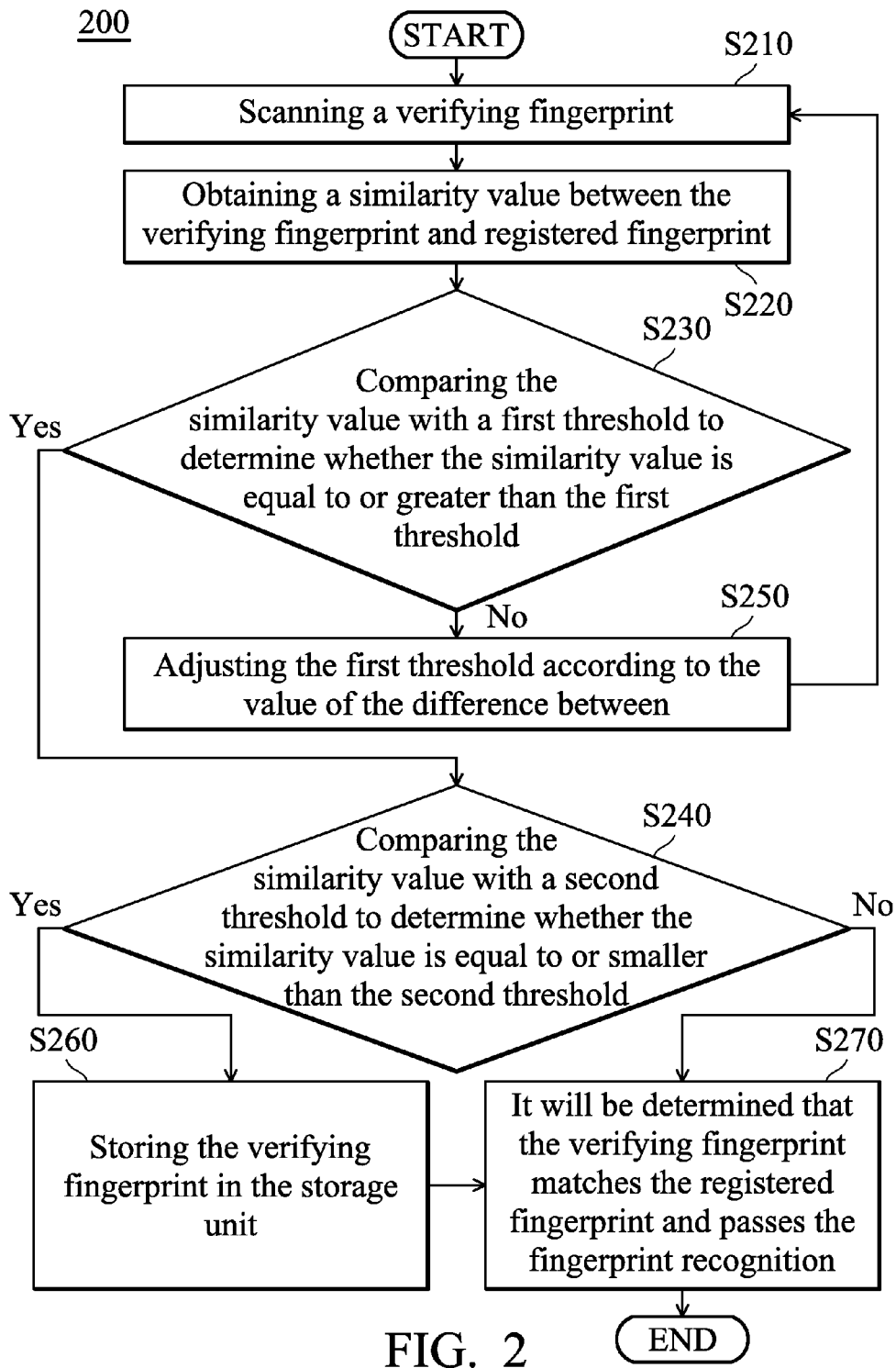
FIG. 2 is a flow chart 200 illustrating the fingerprint recognition method according to an embodiment of the invention.

FIG. 2 is a flow chart 200 illustrating the fingerprint recognition method according to an embodiment of the invention. The fingerprint recognition method is performed by the electronic device 100. As shown in FIG. 2, in step S210, a verifying fingerprint is scanned by the fingerprint sensor 110. In step S220, a similarity value between the verifying fingerprint and registered fingerprint is obtained by the electronic device 100. Then, in step S230, the similarity value is compared with a first threshold to determine whether the similarity value is equal to or greater than the first threshold. If the similarity value is equal to or greater than the first threshold, step S240 is performed. If the similarity value is smaller than the first threshold, step S250 is performed.

In step S240, the similarity value is compared with a second threshold to determine whether the similarity value is equal to or smaller than the second threshold. If the similarity value is equal to or smaller than the second threshold, the verifying fingerprint will be stored in the storage unit by the electronic device 100 (S260). Then, in step S270, it will be determined that the verifying fingerprint matches the registered fingerprint and passes the fingerprint recognition. If the similarity value is greater than the second threshold, the verifying fingerprint will not be stored in the storage unit by the electronic device 100. Then, in step S270, it will be determined that the verifying fingerprint matches the registered fingerprint and passes the fingerprint recognition.

Alternatively, step S270 can be performed before Step 240. Therefore, when the similarity value is equal to or greater than the first threshold, it will be then determined that the verifying fingerprint matches the registered fingerprint and passes the fingerprint recognition (S270). Thereafter, step S240 will be performed. If the similarity value is equal to or smaller than the second threshold, the verifying fingerprint will be stored in the storage unit by the electronic device 100 (S260). If the similarity value is greater than the second threshold, the verifying fingerprint will not be stored in the storage unit by the electronic device 100.

In step S250, the first threshold is adjusted according to the value of the difference between the similarity value and the first threshold. Then, the method returns to steps S210~S230. A verifying fingerprint is scanned by the fingerprint sensor 110 again, a new similarity value between the re-scanned verifying fingerprint and registered fingerprint is obtained, and then the new similarity value is compared with the adjusted first threshold by the electronic device 100. In an embodiment of the invention, in step S250, if the difference is small (i.e. the similarity value approaches the first threshold), the first threshold will be adjusted upward by a small amount by the electronic device 100. If the difference is large, the first threshold will be adjusted upward by a great amount by the electronic device 100.

In an embodiment of the invention, if the new similarity value is still smaller than the adjusted first threshold after a comparison with the adjusted first threshold, steps S210~S230 and S250 will be performed again, until the similarity value is equal to or greater than the adjuster first threshold. If the new similarity value is equal to or greater than the adjusted first threshold after a comparison with the adjusted first threshold, the processing unit will determine the verifying fingerprint matches the registered fingerprint and reset the first threshold to the original default value (non-adjusted first threshold) for subsequent fingerprint recognition.

In the fingerprint recognition method of the embodiment of the invention, the security of the electronic device 100 can be increased. In addition, if the similarity value between the matched verifying fingerprint and registered fingerprint is equal to or smaller than the second threshold, the matched verifying fingerprint will be stored in the storage unit 130 so as to increase the coverage of the registered fingerprint.

The steps of the method described in connection with the aspects disclosed herein may be embodied directly in hardware, in a software module executed by a processor, or in a combination of the two. A software module (e.g., including executable instructions and related data) and other data may reside in a data memory such as RAM memory, flash memory, ROM memory, EPROM memory, EEPROM memory, registers, a hard disk, a removable disk, a CD-ROM, or any other form of computer-readable storage medium known in the art. A sample storage medium may be coupled to a machine such as, for example, a computer/processor (which may be referred to herein, for convenience, as a "processor") such that the processor can read information (e.g., code) from and write information to the storage medium. A sample storage medium may be integral to the processor. The processor and the storage medium may reside in an ASIC. The ASIC may reside in user equipment. Alternatively, the processor and the storage medium may reside as discrete components in user equipment. Moreover, in some aspects any suitable computer-program product may comprise a computer-readable medium comprising codes relating to one or more of the aspects of the disclosure. In some aspects a computer program product may comprise packaging materials.

Reference throughout this specification to "one embodiment" or "an embodiment" means that a particular feature, structure, or characteristic described in connection with the embodiment is included in at least one embodiment of the invention, but do not denote that they are present in every embodiment. Thus, the appearances of the phrases "in one embodiment" or "in an embodiment" in various places throughout this specification are not necessarily referring to the same embodiment of the invention.

The paragraphs above describe many aspects. Obviously, the teaching of the invention can be accomplished by many methods, and any specific configurations or functions in the disclosed embodiments only present a representative condition. Those who are skilled in this technology will understand that all of the disclosed aspects of the invention can be applied independently or be incorporated.

While the invention has been described by way of example and in terms of preferred embodiment, it should be understood that the invention is not limited thereto. Those who are skilled in this technology can still make various alterations and modifications without departing from the scope and spirit of this invention. Therefore, the scope of the present invention shall be defined and protected by the following claims and their equivalents.

What is claimed is:

1. A fingerprint recognition method, comprising:
   scanning, by a fingerprint sensor, a finger to generate a verifying fingerprint;
   obtaining, by a processing unit, a similarity value between the verifying fingerprint and a registered fingerprint;
   comparing, by the processing unit, the similarity value with a first threshold;
   determining, by the processing unit, that the verifying fingerprint matches the registered fingerprint if the similarity value is equal to or greater than the first threshold
   comparing, by the processing unit, the similarity value with a second threshold, wherein the second threshold is greater than the first threshold; and
   storing the verifying fingerprint to a storage unit if the similarity value is smaller than the second threshold.

2. The fingerprint recognition method of claim 1, further comprising:
   adjusting, by the processing unit, the first threshold according to the difference between the similarity value and the first threshold if the similarity value is smaller than the first threshold.

3. The fingerprint recognition method of claim 2, wherein if the difference is small, the first threshold will be adjusted upward by a small amount; and if the difference is great, the first threshold will be adjusted upward by a great amount.

4. The fingerprint recognition method of claim 2, further comprising:
   comparing, by the processing unit, a re-scanned verifying fingerprint with the registered fingerprint to get a second similarity value;
   determining, by the processing unit, the re-scanned verifying fingerprint matches the registered fingerprint if the second similarity value is equal to or greater than the adjusted first threshold; and
   setting, by the processing unit, the adjusted first threshold to the original default value.

5. An electronic device, comprising:
   a fingerprint sensor, scanning a finger to generate a verifying fingerprint;
   a storage unit, storing at least one registered fingerprint;
   a processing unit, connected to the fingerprint sensor and the storage unit, generating a similarity value between the verifying fingerprint and the registered fingerprint, comparing the similarity value with a first threshold, determining that the verifying fingerprint matches the registered fingerprint if the similarity value is equal to or greater than the first threshold, comparing the similarity value with a second threshold, wherein the second threshold is greater than the first threshold, and storing the verifying fingerprint to the storage unit if the similarity value is smaller than the second threshold.

6. The electronic device of claim 5, wherein the processing unit adjusts the first threshold according to a difference between the similarity value and the first threshold if the similarity value is smaller than the first threshold.

7. The electronic device of claim 6, wherein if the difference is small, the processing unit will adjust the first threshold upward by a small amount; and if the difference is great, the processing unit will adjust the first threshold upward by a great amount.

8. The electronic device of claim 6, wherein the processing unit compares a re-scanned verifying fingerprint with the registered fingerprint to get a second similarity value, if the second similarity value is equal to or greater than the adjusted first threshold, the processing unit determines that the re-scanned verifying fingerprint matches the registered fingerprint and sets the adjusted first threshold to the original default value.

* * * * *